United States Patent [19]
Ogawa et al.

[11] Patent Number: 5,785,920
[45] Date of Patent: Jul. 28, 1998

[54] EXTRUSION MOLDING APPARATUS AND METHOD OF FORMING A PARISON

[75] Inventors: Masaaki Ogawa, Kobe; Hajime Ishikawa, Toyonaka, both of Japan

[73] Assignee: Tigers Polymer Corporation, Osaka, Japan

[21] Appl. No.: 774,365

[22] Filed: Dec. 27, 1996

[30] Foreign Application Priority Data

Dec. 28, 1995 [JP] Japan .................................. 7-353306

[51] Int. Cl.$^6$ ...................................................... B29C 49/04
[52] U.S. Cl. ...................... 264/515; 264/40.5; 264/541; 264/171.26; 425/132; 425/381; 425/465; 425/466; 425/523; 425/532
[58] Field of Search ............................ 264/540, 541, 264/40.1, 40.5, 171.26, 171.27, 209.1, 209.8; 425/132, 523, 532, 381, 466, 465

[56] References Cited

U.S. PATENT DOCUMENTS

| | | | |
|---|---|---|---|
| 4,149,839 | 4/1979 | Iwawaki et al. | 425/532 |
| 4,472,129 | 9/1984 | Siard | 264/541 |
| 5,156,857 | 10/1992 | Wang et al. | 264/37 |

FOREIGN PATENT DOCUMENTS

| | | | |
|---|---|---|---|
| 52-18231 | 5/1977 | Japan | 264/40.7 |
| 62-116112 | 5/1987 | Japan | 264/541 |

OTHER PUBLICATIONS

Japanese Patent Application Laid-Open No. 134758/1976.
Japanese Patent Publication No. 5286/1991.
Japanese Patent Publication No. 37026/1977.
Japanese Patent Publication No. 53175/1982.

*Primary Examiner*—Catherine Timm
*Attorney, Agent, or Firm*—Pillsbury, Madison & Sutro LLP; Cushman, Darby & Cushman IP Group

[57] ABSTRACT

A rod 3 is driven forward to open an annular slit 5 between a die 2 and a mandrel 4 and the molten resin in a resin accumulation chamber 10 is expelled from annular slit 5 to form a parison. In this operation, the die 2 is displaced from an original position adjoining to the mandrel 4 (axially aligned position) upon opening of the annular slit 5 to correct for any variation in thickness of parison P to be extruded from the annular slit 5. Then, the molten resin accumulated in accumulation chamber 10 is expelled from annular slit 5 to form parison P. The die 2 is then reset to the original position to bring the die 2 and mandrel 4 into axial alignment. Therefore, as the rod 3 is driven back, the annular slit 5 can be closed tight by the mandrel 4 to prevent resin leakage. After closure of the annular slit 5, molten resin is accumulated again in the accumulation chamber 10 and the annular slit 5 is opened. This procedure is repeated to produce parisons on an intermittent basis.

5 Claims, 2 Drawing Sheets

EXTRUSION MOLDING APPARATUS AND METHOD OF FORMING A PARISON

FIELD OF THE INVENTION

The present invention relates to a molding apparatus of useful for the intermittent production of parisons by extrusion or blow molding and to a method of forming parisons.

BACKGROUND OF THE INVENTION

A monolayer or multilayer (multi-walled) tube is manufactured by extruding molten resin in the form of a parison from an annular die slit, setting the parison in a mold, and carrying out blowing. In this molding operation, molten resin from a resin feeding side-port flows down a circumferential annular passageway and is extruded in an axial (downward) direction from an annular die slit. Therefore, not only the flow and flow rate of molten resin are complicated but also a large pressure disparity between the part corresponding to the resin feeding port and the part opposed to the feeding port, as well as a pressure strain, is created to cause variations in thickness, with the result that a hollow body of uniform wall thickness can hardly be obtained. Particularly in the extrusion-blow molding of a multiwalled hollow product, such a variation tends to occur more readily in each constituent layer.

To correct for such variations in thickness of the parison and hollow product, it is common practice to displace the die in a horizontal direction with an adjusting bolt so as to change the slit dimension between the die and the mandrel. Japanese Patent Laid-open No. (JP-A-)51-134758 discloses an extrusion molding technology for the production of a multi-walled hollow tube wherein while the thickness ratio of constituent layers of the multi-walled structure is controlled by judicious setting of the co-extrusion speeds of the ring piston, the exit width of the resin passageway downstream of the point of convergence of resin streams for respective layers is adjusted by the vertical displacement of the mandrel or the horizontal displacement of the die so as to control the wall thickness. This literature further teaches the utilization of the horizontal displacement of the die for offset control.

Japanese Patent Publication No. (JP-B-)3-5286 discloses a prior art technology which comprises constituting a die with a flexible ring and pressing both lateral sides of the die with actuators to deform the die into an elliptical shape to thereby adjust the annular slit between the die and the mandrel and correct for a variation in thickness of the parison.

However, since the points of variation in thickness of a parison are not diametrically opposed, it is still difficult to obtain a parison and hollow tube of uniform wall thickness even if the thicknesses at opposed points are adjusted. Particularly in the production of a multi-walled hollow product, thickness variations may occur in respective constituent layers so that the thickness of the parison cannot be controlled with accuracy.

Furthermore, in the intermittent production of parisons and hollow tubes using an extrusion-blow molding machine, the variations in thickness result in resin leaks through the clearance between the die and the mandrel. Thus, the intermittent production of parisons and hollow tubes comprises raising the ring piston to close the annular slit between the die and the mandrel, collecting a parison-equivalent amount of molten resin in the accumulation chamber, driving a rod of the mandrel forward to form an annular slit, lowering the ring piston to expel the molten resin from the accumulation chamber to form a parison having a wall thickness corresponding to the slit dimension, and driving the rod and mandrel back to close the annular slit, all as a cycle on an intermittent basis.

Such being the process, when the rod is driven back after the above thickness adjustment of the parison by the adjusting bolt, the annular slit cannot be hermetically closed by the mandrel because of the offset of the die with respect from the mandrel so that a gap typically as wide as about 1 mm is formed between the die and the mandrel. Then, as molten resin is collected in the accumulation chamber with the annular slit having been closed by the mandrel, the resin leaks out from the gap. Therefore, in the long-time repeated production of many parisons and hollow products, a large waste of resin takes place to detract from effective utilization of the resin and economics of production.

Furthermore, as the rod is driven back with a strong force with the die offset from the mandrel, a bending force, instead of an axial force, acts on the rod along the taper of the die and the mandrel to bend the rod and injure the joint between the mandrel and rod. Therefore, the rod should be driven back as gently as possible to let the mandrel be abutted against the head.

Japanese Patent Publication No. (JP-B-)52-37026 discloses an extrusion molding apparatus for multi-walled tubes which, for the purpose of preventing variation in thickness and bending of the parison without adjusting the clearance between the die at the tip of a head and the mandrel, comprises a cylindrical wall element having a temperature regulating function disposed in a laminar arrangement to provide a plurality of cylindrical resin accumulation chambers within a blow-molding head, an extruder for extruding a resin into the accumulation chambers, and a slidable ring piston for expelling the resin from the accumulation chambers. Japanese Patent Publication No. (JP-B-)57-53175 discloses an extrusion molding apparatus comprising a molding head having a die and an annular passageway, a cylindrical partitioning wall and a ring piston as disposed in a laminar, vertically slidable relation in the molding head so as to form a cylindrical accumulation chamber, and an extruding means for extruding a polymer from the cylindrical accumulation chamber. It is taught in these literature that the ring piston is raised (driven back) to prevent leakage of resin from the clearance between the die and the mandrel.

However, since the resin is aspirated into the accumulation chamber by driving the ring piston back so as to prevent leakage, it is necessary that an excess or more than one parison-equivalent of resin should be accumulated in the accumulation chamber. Therefore, the excess of resin in the accumulation chamber is also extruded in the formation of a parison, so that the desired effective utilization of resin cannot be materialized.

SUMMARY OF THE INVENTION

It is an object of the present invention to provide an extrusion molding apparatus and a hollow tube molding method, wherein the thickness of a parison can be accurately controlled and the slit between the die and the mandrel can be closed tight to preclude resin leaks with certainty.

It is a further object of the present invention to provide an extrusion molding apparatus and a hollow tube molding method, by which the thickness of even a multi-walled tube can be controlled with high accuracy.

The inventors of the present invention did much research to accomplish the above-mentioned objects and found that if the rod is driven back after formation of a parison with correction for any variation in wall thickness by extrusion of resin from the annular slit, a gap will be created between the die and the mandrel due to their misalignment but when the rod is driven back after the die has been reset to an original position in axial alignment with the mandrel, no gap is created between the die and the mandrel. The present invention has been developed on the basis of the above finding.

Thus, the extrusion molding apparatus of the present invention comprises, for extruding a parison from an annular slit on an intermitted basis, a die, a mandrel which is axially slidable with respect to the die to form an annular slit therebetween, a rod for driving the mandrel axially with respect to the die, an annular passageway including a molten resin accumulation chamber communicable with the annular slit, and a supply means for feeding molten resin to the annular passageway, the apparatus specifically comprising a thickness adjusting means for displacing the die from an original position adjoining to the mandrel in timed relation with the advance of a rod to adjust the wall thickness of a parison being extruded from the annular slit, an extruding means for extruding the resin accumulated in the molten resin accumulation chamber through the annular slit to form a parison, a resetting means which, in response to completion of extrusion of the resin, resets the die to the original position, and a rod driving mechanism for driving the rod forward to form the annular slit and, in response to resetting of the die, driving the rod in a reverse direction to close the annular slit.

The molding method of the present invention comprises extruding a resin accumulated in a molten resin accumulation chamber from an annular slit defined by a die and a mandrel, wherein the method comprises a step of driving the rod forward to open the annular slit and displacing the die from an original position adjoining to the mandrel to correct for the thickness of the parison to be extruded from the annular slit, a step of extruding the resin accumulated in the accumulation chamber from the annular slit to from a parison, a step of resetting the die to the original position after extrusion of resin, a step of driving the rod back after the resetting of the die to cause the annular slit to be closed by the mandrel, and a step of accumulating molten resin in the accumulation chamber after closure of the annular slit, all of the steps being executed as a cycle to form parisons on an intermitted basis.

DETAILED DESCRIPTION OF THE INVENTION

The present invention is now described in detail with reference to the accompanying drawings.

Figure 1:
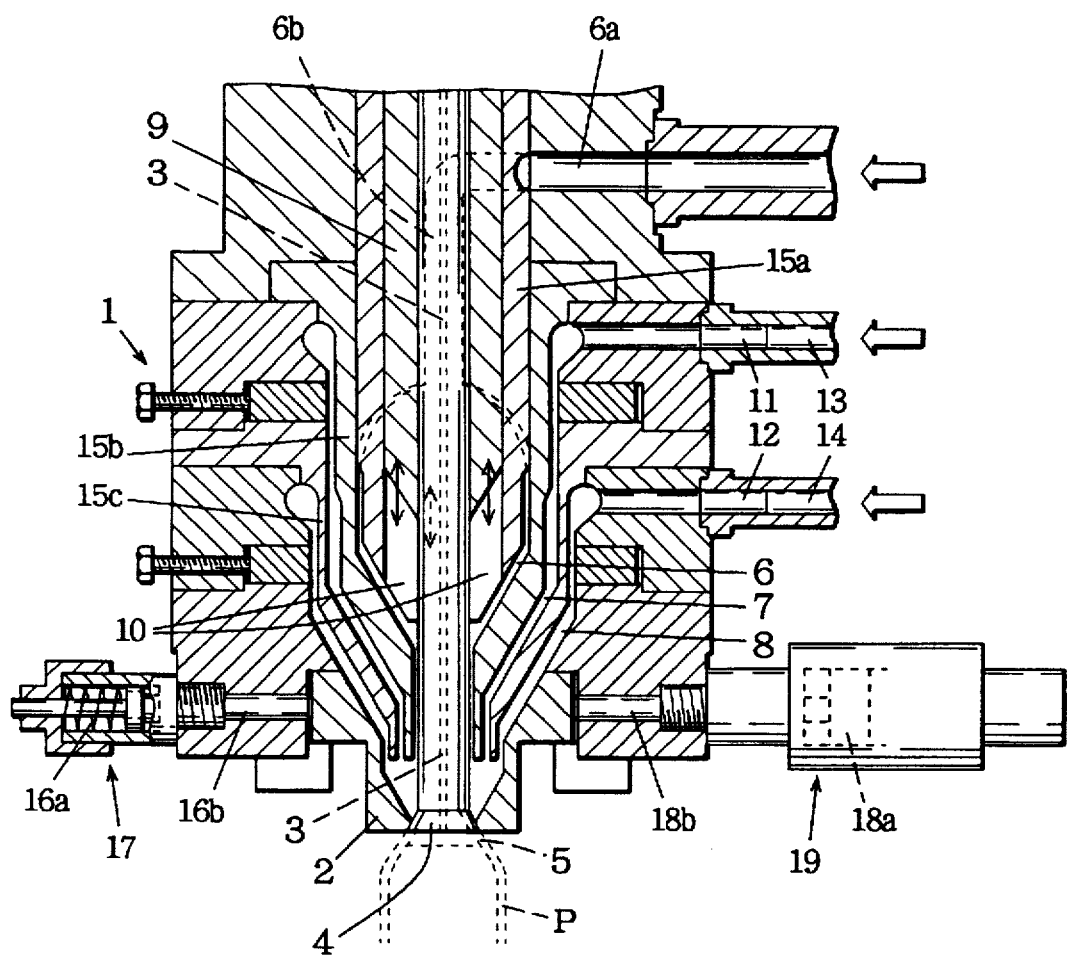
FIG. 1 is a generally longitudinal section view showing an exemplary extrusion molding machine of the invention.
Figure 2:
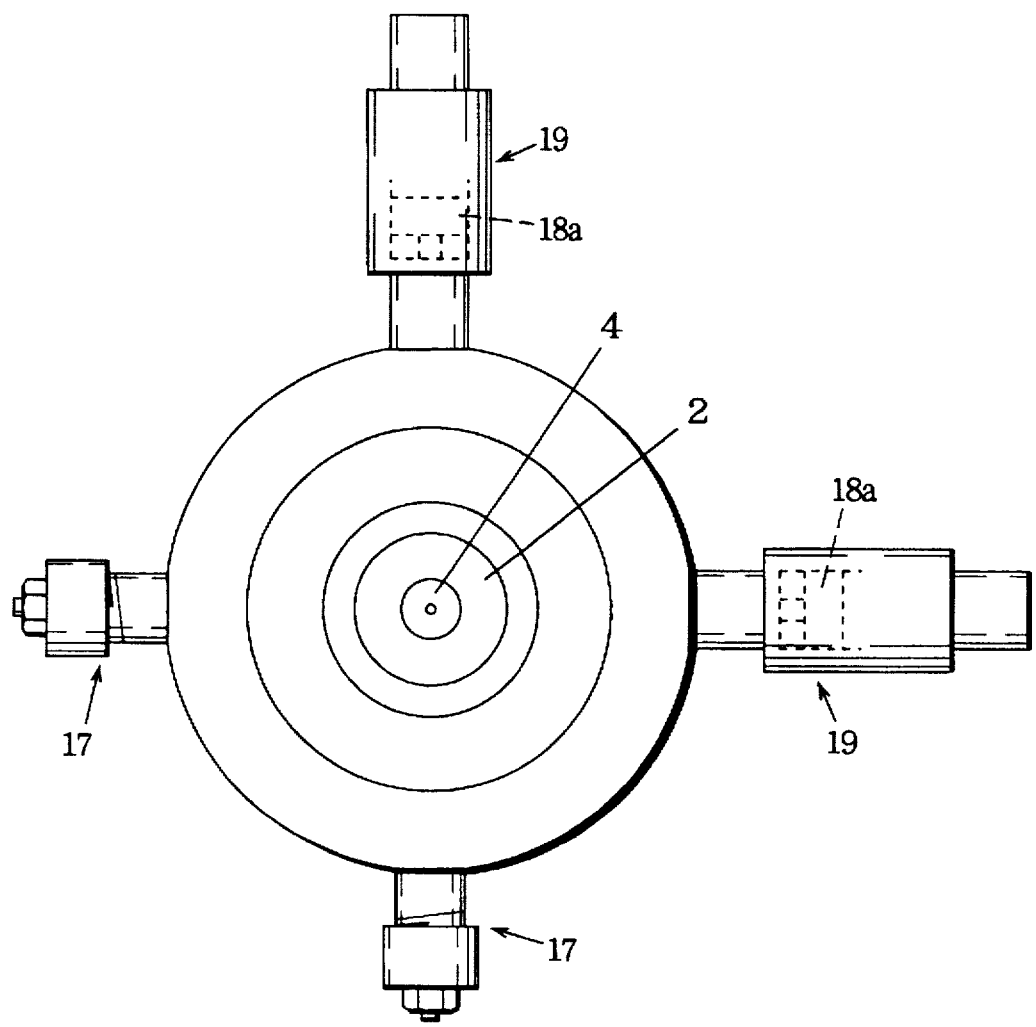
FIG. 2 is a general plan view showing an exemplary section adjusting means shown in FIG. 1.
Figure 3:
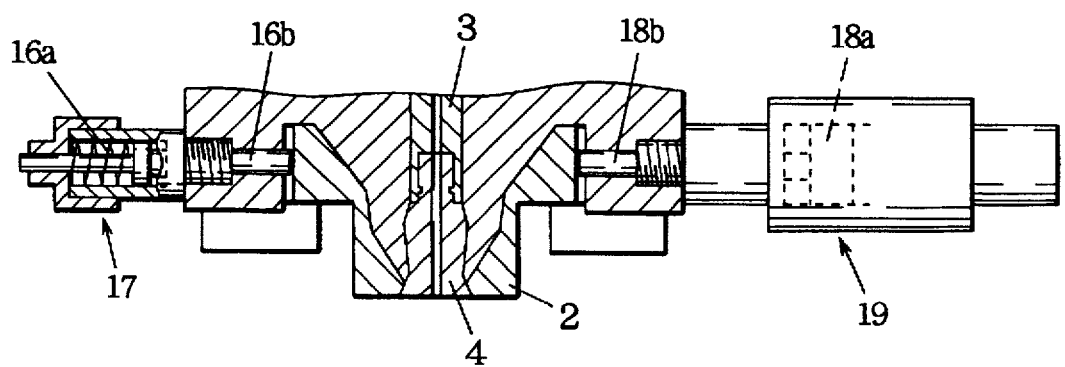
FIG. 3 is a longitudinal section view of the section adjusting means shown in FIG. 1.

FIG. 1 is a generally longitudinal section view showing an exemplary extrusion molding machine of the invention, FIG. 2 is a general plan view showing an exemplary section adjusting means shown in FIG. 1, and FIG. 3 is a longitudinal section view of the section-adjusting means shown in FIG. 1. The illustrated apparatus is intended for the manufacture of three-walled (layered) hollow tubes.

This extrusion molding apparatus comprises a head 1 equipped with a die 2 at its lower end, a rod 3 disposed slidably in an axial (vertical) direction in the axial space within the head 1, a mandrel 4 secured to the forward end of the rod 3 and adapted to form an annular slit 5 with a lip portion of the die 2 in association with the axial advancement of the rod 3 with respect to the die 2, and a plurality of (3 in the illustrated embodiment) annular passageways 6, 7, and 8 formed in concentric relation within the head 1. The mandrel 4 is slidable together with the rod 3 in response to the operation of a cylinder such as a hydraulic cylinder.

Of the above-mentioned annular passageways 6, 7, and 8, the innermost annular passageway (first passage way) 6 that forms the inner wall of a hollow tube (or parison P) extends from an extruder means on top of the head 1 through a resin inlet 6a and a resin passageway 6b and expands annularly into the die 2. Furthermore, a ring piston 9 adapted to reciprocate down to the first annular passageway 6 is disposed within the head 1 and a molten resin accumulation chamber 10 for pooling molten resin temporarily in association with the reverse (upward) movement of the ring piston 9, the accumulation chamber 10 communicates with the first annular passageway 6 and annular slit 5. The molten resin in the resin accumulation chamber 10 is extruded in response to the forward movement of the ring piston 9. The intermediate annular passageway (second passageway) 7 which forms the intermediate wall of the hollow tube and the outer annular passageway (third passageway) 8 which forms the outer wall of the hollow tube are also supplied with molten resin. The molten resins temporarily pooled in respective accumulators 11, 12 are fed on actuation of corresponding plungers 13, 14. In response to the return movement of the plungers 13, 14, molten resins are supplied from the extruder means connected to the head 1 and pooled in the accumulators 11, 12. The molten resins flow through the first through third annular passageways 6, 7, 8 and these tributary resin streams converge within the die 2.

The head 1 is further provided with annular partition walls 15a, 15b, 15c for isolating the annular passageways 6, 7, 8. In this embodiment, the supply means for feeding molten resin to the annular passageways 6, 7, 8 is comprised of the extruder means and either the ring piston or the plungers.

In operation, the rod 3 is driven back (in the upward direction) to engage the lip portion of the die 2 with the mandrel 4 in close contact and the ring piston 9 is driven back axially to pool the molten resin for the inner wall in the resin accumulation chamber 10, while the second and third annular passageways 7, 8 are respectively supplied with molten resin. Then, the rod 3 is driven forward (downward) to make an annular slit 5 between the lip of die 2 and the mandrel 4 and the ring piston 9 and plungers 13, 14 are driven forward, whereupon a three-walled parison P is formed by convergence of resin streams and extruded from the annular slit 5. After formation of the parison 9, the rod 3 is driven back (upward) to close the annular slit 5 with the mandrel 4 and the ring piston 9 is driven back to accumulate molten resin in the accumulation chamber 10, while the plungers 13, 14 are driven back to let the accumulators 11, 12 accumulate molten resin for the intermediate wall and the molten resin for the outer wall to be supplied to the second and third annular passageways 7, 8, respectively. By causing the above operation to be repeated, the parison P and multi-walled hollow tube can be produced on an intermittent basis. However, if, in this operation, the rod 3 is driven back after formation of parison P with section adjustment, a gap will be formed between the die 2 and mandrel 4 so that the resin will leak out to cause a loss of material.

Unlike the conventional arrangement where simultaneously with the opening of the annular slit 5 in response to the advancement of rod 3, the die 2 is displaced from the original position where it is closely abutted against the mandrel 4 (that is the reference position of the die 2 where the axes of mandrel 4 and die 2 are aligned and no gap is formed between the die 2 and mandrel 4) to adjust the thickness and thereby form a parison P uniform in overall thickness before the rod 3 is driven back. Therefore, in the present invention, the die 2 is reset to the original position after formation of parison P and, then, the rod 3 is driven back. In this arrangement (i.e. centering operation), the die 2 can be returned to the original position to bring the axes of die 2 and mandrel 4 into alignment before the rod 3 is driven back to thereby insure a close contact between the die 2 and mandrel 4, with the result that no gap is formed between them.

Thus, the apparatus of the present invention comprises a thickness adjusting means for displacing the die 2 from its original position in association with the advance of the rod 3 to adjust the thickness variation of the parison P extruded from the annular slit 5, the ring piston 9, and plungers 13, 14 (extruding means) for extruding molten resins from the resin accumulation chamber 10 and accumulators 11, 12 from the annular slit 5 to form a parison P, a resetting means for resetting the die 2 to the original position in response to completion of extrusion of molten resin, and the hydraulic cylinder (rod-driving mechanism) for driving the rod 3 forward to open the annular slit 5 and driving the rod 3 back to close the annular slit 5 in response to the resetting of the die 2.

The thickness adjusting means and resetting means mentioned above may each comprise a biasing means for preenergizing the die 2 inwardly in a plurality of circumferential positions and a pressing means movable forward and backward and adapted to press the die 2 inwardly against the biasing means. For example, as shown in FIGS. 2 and 3, there is provided a biasing member 17 equipped with a spring 16a for biasing the die 2 inwardly and a pressor rod 16b for pressing a flat surface formed in the die 2 by means of the preenergizing force of the spring in two circumferential positions adjacent to each other 90° apart on the die 2. Disposed in the position diametrically opposite to the position preenergized by the biasing member 17 is a driving mechanism 19 comprising a hydraulic cylinder 18 (as a pressor means) operable with respect to the die 2 and a pressing rod 18b for transmitting the pressing force of the hydraulic cylinder 18 to the flat surface of the die 2. Namely, a plurality of the opposite positions of the die are pressed inwardly by the biasing means and the pressing means. By means of such thickness adjusting means and resetting means, the die 2 is displaced according to the stroke of the cylinder 18 and, as the pressing force of the cylinder 18 is released, the spring 16 of the biasing member 17 resets the die 2 rapidly to the original position prior to thickness adjustment. Furthermore, since the die 2 can be displaced in two diagonal directions by the hydraulic cylinders 18a disposed in diagonal orientations, the variation in thickness can be effectively precluded even when a plurality of layers are extruded to form a parison P. The displacement and resetting of die 2 can be carried out by means of one set of thickness adjusting means and resetting means, it is more advantageous to displace the die 2 in at least two positions for a more accurate thickness adjustment.

The bias in thickness of parison P, assuming that the extrusion speed is unchanged, is chiefly associated with the size and thickness of parison P and a correlation is found between the size and thickness of parison P and the necessary degree of thickness adjustment (degree of adjustment of the slit dimension). Therefore, the adjustment of this bias can be made automatically according to the above-mentioned correlation.

The extruding means for extruding the molten resin from the annular slit 5 is not limited to the ring piston 9 and plungers 13, 14 but a variety of other extrusion mechanisms for molten resin can be employed. In order to preclude bending and insure a precision forming of parison P, the extruding means is preferably the ring piston 9. For the extrusion of the intermediate and outer walls, too, ring pistons 9 can be used in lieu of the accumulators and plungers 13, 14.

The operation described above can be performed by means of an automatic system comprising an input means with which the desired size and wall thickness values of parison P can be entered, an operation circuit which calculates the amount of control necessary for each action according to the input data and the data (the thickness adjustment data corresponding to the size and thickness of parison P) stored in a memory (memory means), and a control circuit which outputs a control signal representing the amount of control to be applied to a driving circuit for the mechanism. Regarding the action for the thickness adjustment (step 1), for instance, the size and wall thickness of parison P are entered from the input means of the automatic system and based on the data (thickness adjustment data correlated with the size and wall thickness of parison P) stored in the memory (memory means), the stroke (control amount) of the hydraulic cylinder as the thickness adjusting means or the resetting means is computed in the operation circuit. In the above control system, the control circuit responding to a start signal from the input means outputs a forward signal to the driving circuit for the hydraulic cylinder to drive the rod 3 and, at the same time, the control circuit outputs a driving signal corresponding to the amount of control to the driving circuit for the hydraulic cylinder 18a for thickness adjustment to drive the hydraulic cylinder by a given distance either way.

Furthermore, as mentioned above, the control circuit responding to the start signal outputs the control amount data calculated by the operation circuit according to input thickness data as a forward signal to the driving circuit for the hydraulic cylinder for driving the rod 3 to cause the rod 3 to slide forward by a distance corresponding to the wall thickness of parison P (step 2).

With regard to the extruding action (step 3) for forming the parison P, the control circuit responding to the start signal or sensing completion of extension of the hydraulic cylinder 18a for thickness adjustment outputs a forward signal to the driving circuit for the hydraulic cylinder which drives the ring piston 9 and the driving circuit for the hydraulic cylinders which drives the plungers 13, 14 to thereby cause the ring piston 9 and plungers 13, 14 to slide each by a given distance.

The resetting action (step 4) takes place as follows. In response to completion of movement of the ring piston 9 and plungers 13, 14, the control circuit outputs a reset signal to the driving circuit of the hydraulic cylinder 18 for thickness adjustment to cause an action opposite to the thickness adjustment action so as to reset the hydraulic cylinder 18a to the original position. The control circuit responding to the reset signal or completion of the resetting motion of the hydraulic cylinder outputs a back signal to the driving circuit of the hydraulic cylinder for driving the rod 3 to thereby drive the rod 3 in a reverse direction to close the annular slit 5 (step 5).

Furthermore, in response to a signal representing completion of the reverse movement of rod 3, the control circuit outputs a back signal to the driving circuit of ring piston 9 and the driving circuit of plungers 13, 14 to cause the ring piston 9 and plungers 13, 14 to retreat each by a predetermined distance and thereby letting a predetermined amount of molten resin accumulate in each of the molten resin accumulation chamber 10 and accumulators 11, 12 (step 6).

Then, in response to a signal representing completion of the reverse movement of the ring piston 9 and plungers 13, 14, the control circuit outputs a forward signal to the driving circuit for the rod 3 and the driving circuit for the hydraulic cylinder 18a for thickness adjustment to repeat the thickness adjustment action (the action of step 1) through the action of step 6 (resin accumulation).

With the extrusion molding apparatus described above, the step of advancing the rod 3 to open the annular slit 5, the thickness adjusting step for displacing the die 2 from its original position, the extruding step of extruding the resin in the molten resin accumulation chamber 10 from the annular slit 5 to form a parison P, the step of resetting the die 2 to the original position, the step of driving the rod 3 in a reverse direction to close the annular slit 5, and the step of accumulating molten resin in the molten resin accumulation chamber 10 and accumulators 11, 12 can be executed in repetition for continuous production of hollow tubes at a predetermined interval. Particularly since the die 2 is reset into axial alignment with the mandrel 4, i.e. centering of the die 2 and the mandrel 4, before the rod 3 is driven back, the annular slit 5 can be tightly closed with the mandrel 4 even after thickness adjustment, the creation of a gap between die 2 and mandrel 4 is precluded. Therefore, a parison of uniform wall thickness can be produced and molten resin leaks can be prevented even when thickness adjustment is made.

Although the above description pertains to the production of a three-walled parison, the parison may be a single-walled (layered) parison. The single-walled parison is preferably formed with a molding system or apparatus equipped with an annular passageway having the molten resin accumulation chamber and a ring piston.

The extrusion molding apparatus of the present invention is also of use as a preblowing means which infuses or supplies a gas such as air into the parison for shape retention through the bore formed axially in the rod 3.

In the above apparatus, the pressing means constituting the thickness adjusting means and resetting means are not restricted to hydraulic cylinders 18 but can be other known reciprocal driving means capable of forward and reverse actions and having a positioning function, such as reciprocal mechanisms utilizing a stepping motor (e.g. a worm and rack system which transforms the rotary motion of a stepping motor into a reciprocating motion through gearing), for instance. The biasing means may be any known means, for example a variety of cylinders, shock absorbers, and other means capable of biasing with a constant pressure.

In the production apparatus and molding method of the present invention, the sequence is that a parison is formed after thickness adjustment and the rod is driven back after the die has been reset to the original position (centering position). Therefore, not only the sectional uniformity of the parison can be insured but also the slit between the die and mandrel can be hermetically closed. Therefore, resin leaks can be positively prevented to permit effective utilization of the resin for the formation of the parison and hollow tube. Furthermore, since thickness adjustment is made in a plurality of positions of the die, the variation in wall thickness can be adjusted with high accuracy even in the production of a tube made up of a plurality of layers so that parisons and hollow tubes of exact thickness can be manufactured.

What is claimed is:

1. An extrusion molding apparatus, for the extrusion of a parison from an annular slit on an intermittent basis, comprising a die, a mandrel adapted to define an annular slit with said die, a rod secured to said mandrel, annular partition walls which define an annular passageway which has a molten resin accumulation chamber communicable with said annular slit, and a supply means for feeding molten resin to said annular passageway wherein said supply means includes an extruder, wherein said apparatus further comprises a thickness adjuster which radially displaces the die from an original position where said die closely contacts with said mandrel to positions separated from said mandrel so that said annular slit is varied in association with forward movement of said rod to correct for variation in thickness of a parison to be extruded from said annular slit, a piston means for extruding the resin accumulated in said molten resin accumulation chamber through said annular slit to form a parison, a resetting means for resetting the die to said original position, a control means for signaling said resetting means, in response to completion of extrusion of the resin, to reset the die to said original position, and a driving mechanism which drives said rod and mandrel in a forward direction to form said annular slit, said control means signaling said rod and mandrel, in response to resetting of the die, to drive said rod in a reverse direction to close the annular slit.

2. An extrusion molding apparatus according to claim 1 wherein said thickness adjusting means and resetting means are each comprised of a biasing means preenergizing the die inwardly in a plurality of circumferentially spaced-apart positions and a pressing means capable of advancing and retreating for pressing the die inwardly against said biasing means.

3. An extrusion molding apparatus according to claim 1 further comprising a plurality of annular passageways formed in a concentric pattern and converging to communicate with said annular slit, a molten resin accumulation chamber formed at least in the innermost one of said annular passageways, a ring piston which reciprocates axially to accumulate molten resin in said molten resin accumulation chamber and expel the molten resin accumulated in said molten resin accumulation chamber, and a supply means for feeding molten resin to said respective annular passageways.

4. A method of extruding a molten resin accumulated in a molten resin accumulation chamber from an annular slit defined by a die and a mandrel to form a parison, which comprises (1) a step of driving a rod forward to open said annular slit and radially displacing the die from an original position where said die is in contact with said mandrel to correct for variation in thickness of a parison to be extruded from said annular slit, (2) a step of extruding the resin in said molten resin accumulation chamber from said annular slit to form a parison, (3) a step of resetting said die to said original position after extrusion of the resin, (4) a step of driving said rod in a reverse direction to close said annular slit with respect to said mandrel after said resetting of the die, and (5) a step of accumulating molten resin in said molten resin accumulation chamber after closure of the annular slit, said steps being executed repeatedly in the sequence mentioned to form parisons on an intermittent basis.

5. A method of forming a parison according to claim 4 for the production of a multi-walled hollow tube, which comprises supplying molten resin through a plurality of annular passageways provided in a concentric pattern, converging streams of molten resin from said passageways and extruding the resin from an annular slit to form a parison, wherein said step (1) comprises biasing the die inwardly in a plurality of circumferential positions and pressing the die inwardly in opposite directions with a pressing means movable forward and backward, and said extruding step (2) comprises extruding the molten resin accumulated in the molten resin accumulation chamber formed at least in the innermost one of said plurality of annular passageways with a ring piston.

* * * * *